United States Patent [19]

Coll

[11] Patent Number: 5,181,680
[45] Date of Patent: Jan. 26, 1993

[54] TRAP SLEEVE MOUNTING BRACKET

[75] Inventor: Gene Coll, Cranford, N.J.

[73] Assignee: Diamond Communication Products, Inc., Garwood, N.J.

[21] Appl. No.: 750,089

[22] Filed: Aug. 27, 1991

[51] Int. Cl.$^5$ .............................................. E21F 17/02
[52] U.S. Cl. .................................... 248/61; 248/68.1; 248/542
[58] Field of Search ...................... 248/61, 542, 58, 63, 248/65, 68.1

[56] References Cited

U.S. PATENT DOCUMENTS

| 429,357 | 6/1890 | McBee | 248/68.1 |
| 566,544 | 8/1896 | Smith | 248/68.1 |
| 831,245 | 9/1906 | Share | 248/68.1 |
| 1,873,357 | 8/1932 | John | 248/61 |
| 3,146,982 | 9/1964 | Budnick | 248/68.1 |
| 4,466,589 | 8/1984 | Leonardo | 248/61 |
| 4,892,275 | 1/1990 | Szegda | 248/61 |

*Primary Examiner*—David M. Purol
*Attorney, Agent, or Firm*—Wegner, Cantor, Mueller & Player

[57] ABSTRACT

A trap sleeve mounting bracket is used to mount a plurality of trap sleeves on a cable. The disclosed trap sleeve mounting bracket includes a tap bracket having a cable-connecting portion and a planar bottom portion, a connector for connecting the cable-connecting portion of the tap bracket to the cable, a planar adapter plate removably attached to the planar bottom portion of the tap bracket, and at least one W-shaped clip removably attached to the adapter plate which holds two trap sleeves in parallel relation to the cable. Two W-shaped clips are preferably attached to the adapter plate to allow the mounting of four trap sleeves. The W-shaped clips are preferably provided with windows to allow visual inspection of traps mounted therein, and the clips and the adapter plate are preferably provided with tabs to prevent relative rotation therebetween.

13 Claims, 2 Drawing Sheets

TRAP SLEEVE MOUNTING BRACKET

BACKGROUND OF THE INVENTION

This invention relates to a bracket for mounting trap sleeves and the like.

Bracket devices have been developed in the CATV industry to allow for proper installation of trap devices within enclosures. One bracket system, the "TH-2" by Midwest CATV (available from Production Products Co., Manlius, New York), mounts two trap shields and includes a trap hanger bracket with a strand clamp, nut and bolt, and top and bottom clamp blocks with a bolt, washer, lockwasher and nut. The "TH-4", also available from Production Products Co., is similar to the "TH-2" but also includes a center clamp block and mounts four trap sleeves. Other bracket systems include the "SC73" mid-span support bracket (produced by Sachs Canada Inc., Dorval, Quebec) and the "606-SMB"0 strand mounting bracket (available from Multilink TM, Elyria, Ohio).

However, commercial trap sleeve mounting bracket systems have suffered from problems such as manufacturing and installation inconveniences. Commercial trap sleeve mounting brackets also suffered from drawbacks such as unreliable assembly and mounting.

SUMMARY OF THE INVENTION

The invention overcomes the above-mentioned disadvantages of prior art mounting brackets and provides a trap sleeve mounting bracket which is readily assembled and installed on a cable and which reliably secures trap sleeves in place. Other advantages will be apparent from the detailed description of the inventive trap sleeve mounting bracket, which includes:

- a tap bracket having a cable-connecting portion and a planar bottom portion;
- connecting means for connecting the cable-connecting portion of the tap bracket to the cable;
- a planar adapter plate removably attached to the planar bottom portion of the tap bracket; and
- at least one W-shaped clip removably attached to said planar adapter plate and adapted to hold two trap sleeves in parallel relation to the cable.

BRIEF DESCRIPTION OF THE DRAWINGS

In these drawing FIGURES, like reference numbers are used to depict like elements.

DESCRIPTION OF PREFERRED EMBODIMENTS

Figure 1:
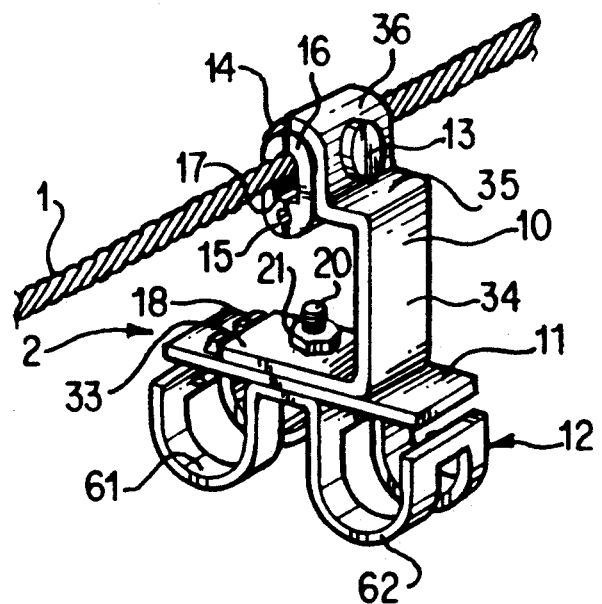
FIG. 1 shows one embodiment of a double-sleeve mounting bracket suspended from a cable.

According to a preferred embodiment of the invention shown in FIG. 1, a double-sleeve mounting bracket 2 is suspended from a cable or strand 1. The assembly includes one "W"-shaped clip 12 fastened to an adapter plate 11 suspended from the cable 1 by means of a tap bracket 10. Preferably, the clip 12 material is spring steel and the adapter plate 11 is made of aluminum.

The tap bracket 10 is shaped so that when mounted on a cable 1, the clip 12 will properly suspend trap sleeves 3 substantially parallel with the cable 1. Preferably, the tap bracket has a plate-abutting portion 33, a vertical portion 34, a portion 35 parallel to the plate-abutting portion 33, and a clamping portion 36.

The tap bracket 10 is preferably mounted to the strand 1 by means of a bolt 13 and nut 14, with the bolt 13 passing through clamping portion 36. Cable-mounting portions 15, 16 are clamped together between the tap-bracket clamping portion 36 and the nut 14, forming a cable passage 17 therebetween.

The tap bracket 10 is fastened to the adapter plate 11 by means of a nut 21 and bolt 20 or the like. The fastening means 20 and 21 also function to secure the clip 12 to the adapter plate 11. Preferably, an embossed abutment tab 18 projects from the adapter plate 11 to maintain the proper position of tap bracket 10 thereon.

The "W"-shaped clip includes a pair of "W" bracket flanges 62 which cradle trap sleeves 3. Preferably, the flanges 62 have windows 61 formed therein to permit visual inspection of the strand-suspended trap sleeves 3 and the bracket assembly 2.

Figure 2:
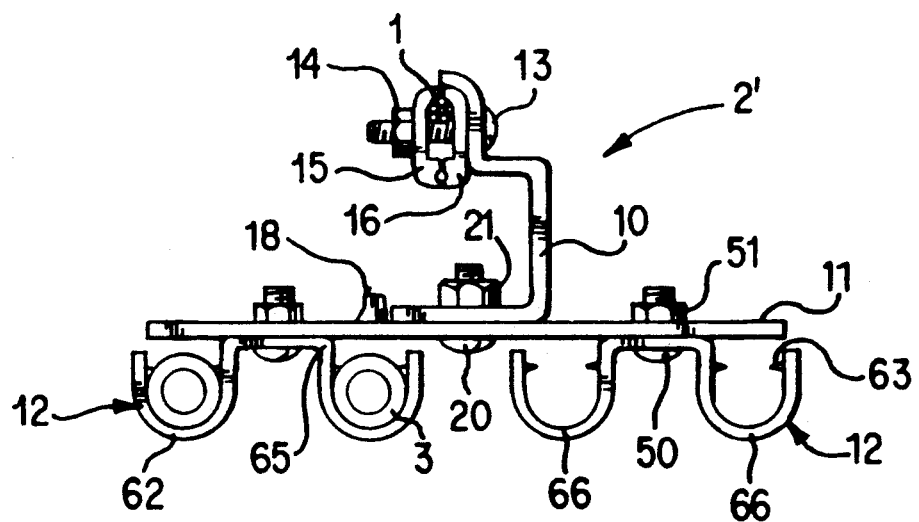
FIG. 2 shows an embodiment of a quadruple-sleeve mounting bracket in accordance with the invention.

Preferably, a plurality of "W"-shaped clips 12 may be mounted on the adapter plate 11. In the preferred embodiments of the quadruple-s brackets 2' shown in FIGS. 2 and 3, the adapter plate 11 can mount two clips 12 for holding up to four traps sleeves 3.

Figure 3:
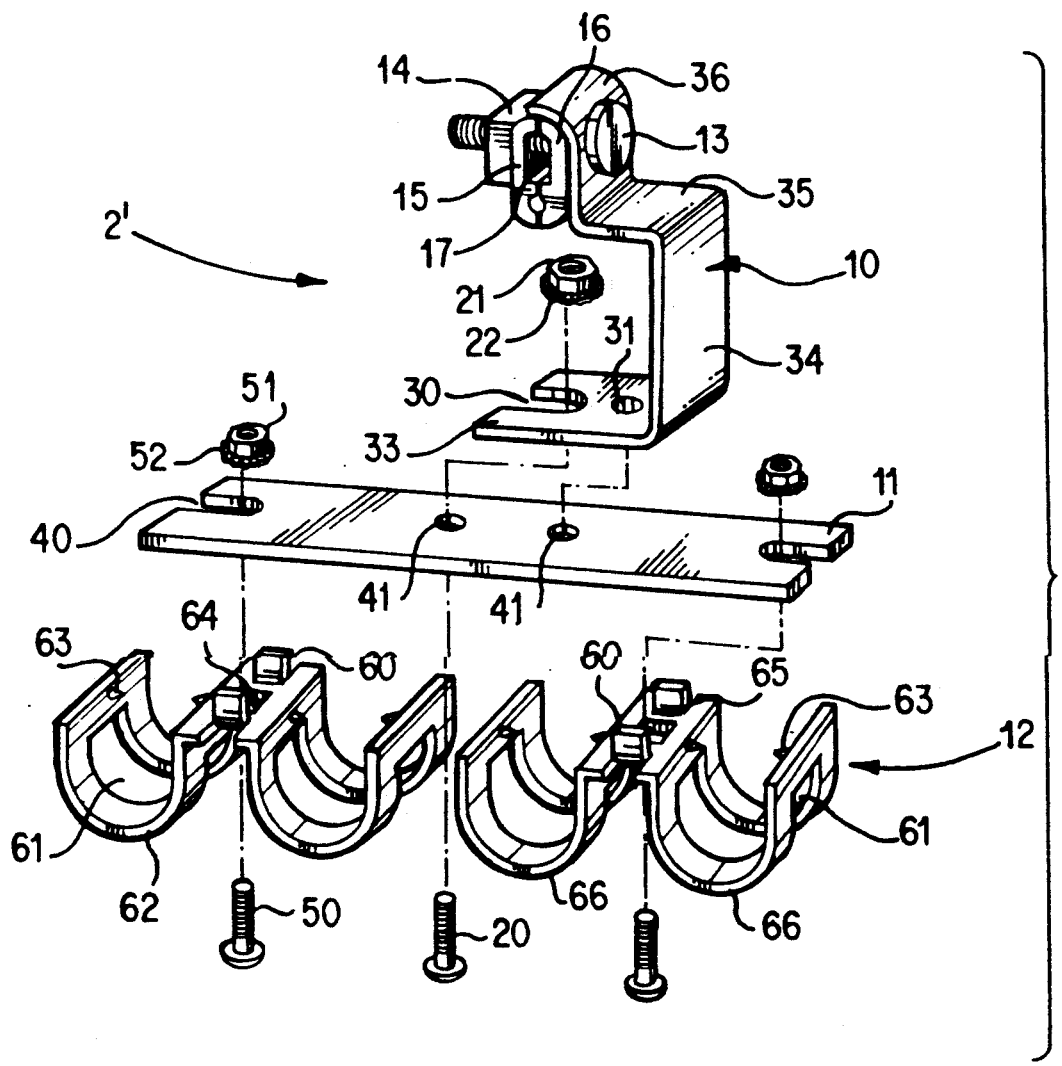
FIG. 3 shows an exploded view of another embodiment of the quadruple-sleeve mounting bracket.
Figure 4:
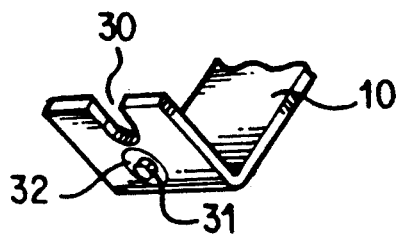
FIG. 4 shows a detail of the bottom of a preferred embodiment of a tap bracket element.

Each clip 12 is secured to the adapter plate by fasteners such as carriage bolts 50 and hex nuts 51; preferably, toothed locking washers 52 are used in combination with nuts 51 and bolts 50 for secure mounting. As shown in FIG. 3, a preferred adapter plate 11 includes slots 40 through which the shank of bolts 50 pass, to allow for convenient assembly.

The shanks of bolts 50 also pass through apertures 64 in planar portions 65 of the "W" clips 12 abutting the adapter plate 11. Anti-rotational projections 60 are preferably provided on the planar flange portions 65 to maintain the proper orientation between the clips 12 and the adapter plate 11, in turn maintaining the proper orientation of the sleeves 3 supported within cradle flange portions 66 of the clips 12. Additionally, check tabs 63 are provided on the cradle portions 66 of the flanges 62, which permit passage of the sleeve 3 within each cradle portion 66 while inhibiting mispositioning of the sleeve 3.

The adapter plate 11 may be secured to the tap bracket 10 by a bolt 20 and nut 21; preferably, a locking washer 22 is used to provide a more secure fastening, as shown in FIG. 3. One or more holes 41 are formed in the adapter plate 11 to allow for proper placement of the tap bracket 10 on the plate 11, whereby bracket 2' holds the trap sleeves 3 in the desired orientation. Preferably, an elongate slot 30 is provided in addition to an aperture 31 in the plate-abutting portion 33 of the tap bracket 10, to also allow for proper positioning of the tap bracket 10 on the plate 11 and convenient assembly.

In addition to or instead of an abutment tab 18 or similar projection on the adapter plate 11, a projecting ring 32, formed, e.g., by dowel embossing, may be provided on the plate-abutting surface of tap-bracket portion 33. The outside diameter of the projecting ring 32 is slightly smaller than the diameter of the hole 41 or arcuate diameter of the slot 40, so that the ring 32 mates within the slot 40 or hole 41 in the adapter plate to securely position the tap bracket 10 against undesired movement. If desired, abutment tabs 18 can be used in combination with projecting rings 32 to reliably mount the tap bracket 10 on the adapter plate 11.

While there are shown and described present embodiments of the invention, it is to be distinctly understood that the invention is not limited thereto, but may be otherwise variously embodied and practiced within the scope of the following claims.

What is claimed is:

1. A trap sleeve mounting bracket for mounting a plurality of trap sleeves on a cable, comprising:
   a tap bracket having a cable-connecting portion and a planar bottom portion;
   connecting means for connecting the cable-connecting portion of the tap bracket to the cable;
   a planar adapter plate removably attached to the planar bottom portion of the tap bracket; and at least one W-shaped clip removably attached to said planar adapter plate and having two cradle portions adapted to hold two trap sleeves in substantially parallel relationship to the cable, each of the cradle portions being provided with a window opening therein which allows visual inspection of a trap mounted therein; wherein the bottom portion of the tap bracket comprises a projection which engages an aperture formed in the adapter plate to maintain a constant orientation between the tap bracket and the adapter plate.

2. A trap sleeve mounting bracket as claimed in claim 1, wherein two of said W-shaped clips are removably attached to the planar adapter plate.

3. A trap sleeve mounting bracket as claimed in claim 1, wherein said at least one W-shaped clip has a planar flange portion which is provided with anti-rotational projections which engage the adapter plate so as to maintain a constant orientation therebetween.

4. A trap sleeve mounting bracket as claimed in claim 1, wherein the cradle portions of said at least one W-shaped clip are provided with positioning means to prevent improper positioning of trap sleeves mounted therein.

5. A trap sleeve mounting bracket as claimed in claim 2, wherein slots are provided in the adapter plate for mounting of the W-shaped clips thereto.

6. A trap sleeve mounting bracket as claimed in claim 1, wherein the clip portion is made of spring steel.

7. A trap sleeve mounting bracket for mounting a plurality of trap sleeves on a cable, comprising:
   a tap bracket having a cable-connecting portion and a planar bottom portion;
   connecting means for connecting the cable-connecting portion of the tap bracket to the cable;
   a planar adapter plate removably attached to the planar bottom portion of the tap bracket, wherein the adapter plate comprises an abutment tab which engages the bottom portion of the tap bracket to maintain a constant orientation therebetween; and
   at least one W-shaped clip removably attached to said planar adapter plate and having two cradle portions adapted to hold two trap sleeves in substantially parallel relationship to the cable, each of the cradle portions being provided with a window opening therein which allows visual inspection of a trap mounted therein;
   wherein the bottom portion of the tap bracket further comprises a projection which engages an aperture formed in the adapter plate to maintain a constant orientation between the tap bracket and the adapter plate.

8. A trap sleeve mounting bracket as claimed in claim 7, wherein two of said W-shaped clips are removably attached to the planar adapter plate.

9. A trap sleeve mounting bracket as claimed in claim 7, wherein said at least one W-shaped clip is provided with two windows allowing visual inspection of traps mounted therein.

10. A trap sleeve mounting bracket as claimed in claim 7, wherein said at least one W-shaped clip has a planar flange portion which is provided with anti-rotational projections which engage the adapted plate so as to maintain a constant orientation therebetween.

11. A trap sleeve mounting bracket as claimed in claim 7, wherein the cradle portions of said at least one W-shaped clip are provided with positioning means to prevent improper positioning of trap sleeves mounted therein.

12. A trap sleeve mounting bracket as claimed in claim 9, wherein slots are provided in the adapter plate for mounting of the W-shaped clips thereto.

13. A trap sleeve mounting bracket as claimed in claim 7, wherein the clip portion is made of spring steel.

* * * * *